United States Patent
Goldmann et al.

(10) Patent No.: US 10,565,226 B2
(45) Date of Patent: Feb. 18, 2020

(54) APPLICATION PROGRAM INTERFACE MANAGING SYNCHRONIZED DATA REPLICATION

(71) Applicant: SuccessFactors, Inc., South San Francisco, CA (US)

(72) Inventors: Daniel Goldmann, Mannheim (DE); Esther Landes, Woerth (DE); Mario Andy Mueller, Muehlhausen (DE); Klemens Schmid, Wiesloch (DE); Thomas Witzel, St. Leon-Rot (DE); Joachim Pfeifer, Buehl (DE); Matthias Klauer, Weinheim (DE); Oleg Loewen, Karlsruhe (DE)

(73) Assignee: SuccessFactors, Inc., South San Francisco, CA (US)

( * ) Notice: Subject to any disclaimer, the term of this patent is extended or adjusted under 35 U.S.C. 154(b) by 531 days.

(21) Appl. No.: 15/012,554

(22) Filed: Feb. 1, 2016

(65) Prior Publication Data
US 2017/0220658 A1    Aug. 3, 2017

(51) Int. Cl.
*G06F 16/27*    (2019.01)
(52) U.S. Cl.
CPC .................................. *G06F 16/27* (2019.01)
(58) Field of Classification Search
None
See application file for complete search history.

(56) References Cited

U.S. PATENT DOCUMENTS

| | | | |
|---|---|---|---|
| 9,740,700 B1* | 8/2017 | Chopra | G06F 17/30088 |
| 2005/0033777 A1* | 2/2005 | Moraes | G06F 16/27 |
| 2005/0071379 A1* | 3/2005 | Kekre | G06F 3/0605 |
| 2006/0036676 A1* | 2/2006 | Cardone | H04L 67/36 |
| | | | 709/203 |

* cited by examiner

*Primary Examiner* — Charles D Adams
(74) *Attorney, Agent, or Firm* — Fountainhead Law Group P.C.

(57) ABSTRACT

An Application Program Interface (API) manages synchronization and replication of master data of a system with different consumers. An API engine is configured to receive from the third party, a query including content information and date-relevant information including a start date, an end date, and a date of last synchronization. The API engine processes the query to access the database and produce a query result replicating only data changes affecting that period or a previous time. The consumer thus specifies the time period in which to consider changes to the stored database data, and the API calculates the delta according to that period. In this manner complex, time-dependent delta calculation and filtering logic can be implemented in the API without requiring substantial logic or additional data persistence in middleware. Particular embodiments may facilitate efficient synchronized replication of employment data to outside (e.g., payroll, benefits) providers.

9 Claims, 20 Drawing Sheets

```
<urn:query>
    <urn:queryString>
        SELECT person, personal_information, employment_information, job_information
        FROM CompoundEmployee
        WHERE last_modified_on > to_datetime(LastSynchronizationDate)
        AND fromDate = to_date(FromDate,'YYYY-MM-DD')
        AND toDate = to_date(ToDate,'YYYY-MM-DD')
    </urn:queryString>
    <urn:param>
        <urn:name>queryMode</urn:name>
        <urn:value>delta</urn:value>
    </urn:param>
</urn:query>
```

FIG. 2C

```
<person>
    <action>NO CHANGE</action>                                    ← 200
    <created_by>root</created_by>
    <created_on_timestamp>2014-05-14T07:20:55.000Z</created_on_timestamp>
    <last_modified_by>jmiller</last_modified_by>
    <last_modified_on>2014-05-14T07:20:55.000Z</last_modified_on>
    <person_id>1180</person_id>
    <person_id_external>261</person_id_external>
    <personal_information>
        <action>CHANGE</action>                                    ← 200
        <start_date>2014-11-08</start_date>
        <end_date>9999-12-31</end_date>
        <first_name>Steve</first_name>
        <last_name>Delta</last_name>
        <gender>M</gender>
        <marital_status>M</marital_status>                         ← 200
        <previous_marital_status>S</previous_marital_status>
        <created_by>cgrant</created_by>
        <created_on_timestamp>2014-10-27T09:20:56.000Z</created_on_timestamp>
        <last_modified_by>cgrant</last_modified_by>
        <last_modified_on>2014-10-27T09:20:56.000Z</last_modified_on>
    </personal_information>
</person>
```

FIG. 2D

```
/**
 * modifies the records for Period Related Delta Transmission
 * we remove all future records depending on the period and the image
 * @param records - the records
 */
private void modifyRecordsForPeriodCalculation(List<T> records) { if (records.isEmpty()) {
        return;
    }

// we determine the relevant date for the deletion of the future records
    Date relevantDate;
    if (image.isSnapshot() && !isNotFirstQuery()) {
        relevantDate = getPreviousDayBegin(fromDate);
    } else {
        relevantDate = toDate;
    }

// we remove the future records and adapt the end date of the last valid record
    Iterator<T> it = records.iterator();
    T validRecord =null;
    Date startDateOfValidRecord = null;
    while (it.hasNext()) {
        T record = it.next();
        Date startDateOfRecord = deltaEntity.getEffectiveStartDate(record);
        // we remove all records that start after the relevant date
        if (startDateOfRecord.after(relevantDate)) {
            it.remove();
            continue;
        }
        // we determine the record with the highest start date which is valid at
        // the relevant date.
        if (startDateOfValidRecord == null
            || startDateOfValidRecord.after(startDateOfRecord)) {
            // we set  the record as valid record
            startDateOfValidRecord = startDateOfRecord;
            validRecord = record;
        }
    }
    // we adapt the end date of the valid record to end of time
    if (validRecord != null) {
        deltaEntity.setEffectiveEndDate(validRecord, MAXIMUM_END_DATE);
    }
}
```

FIG. 4C

APPLICATION PROGRAM INTERFACE MANAGING SYNCHRONIZED DATA REPLICATION

BACKGROUND

Unless otherwise indicated herein, the approaches described in this section are not prior art to the claims in this application and are not admitted to be prior art by inclusion in this section.

Embodiments relate to data handling, and in particular to an application program interface (API) affording data replication in a synchronized manner.

The increase in power and flexibility of data warehouses, has encouraged the sharing/replication of database data between multiple consumers. One challenge with such approaches is to efficiently maintain accurate synchronization between master data and data replicated therefrom for external consumption.

In an employment context, for example, an employee's status may be slated to change as of a certain future date (e.g., an upcoming marriage date resulting in a name change). However it would be premature to actually change the data stored in the data warehouse until that future (marriage) event actually occurs.

Nonetheless, master employment data stored internally by an entity, may be called for periodic accurate access and replication by external third parties (e.g., providers of payroll and/or benefits services).

Conventional approaches may seek to address this issue by implementing specialized data persistence in middleware, in order to track the changes of employee data and to filter out future changes. However, such approaches can render integration more complex, and require application logic to be provided in the middleware. Also, the persistence of data in the middleware can consume scarce and expensive storage resources.

SUMMARY

Embodiments relate to an Application Program Interface (API) managing synchronization and replication of master data of a system with different consumers. An API engine is configured to receive from the data consumer, a query including content information and date-relevant information including a start date, an end date, and a date of last synchronization. The API engine processes the query to access the database and produce a query result replicating only data changes affecting that period or a time previous thereto. The consumer thus specifies the time period in which to consider changes to the stored database data, and the API calculates the delta according to that period. In this manner, time-dependent delta calculation and filtering can be implemented in the API without requiring substantial logic or additional data persistence in the middleware. Particular embodiments may facilitate efficient synchronized replication of employee data from an entity's internal Human Resources Management (HRM) data warehouse, to other systems or third party service providers (e.g., payroll and/or benefits providers).

An embodiment of a computer-implemented method comprises an engine receiving from a consumer, a query including a start date of a time period, an end date of the time period, and a last synchronization date. The engine references the last synchronization date to create a snapshot image from a database. The engine references the query to create a current image from the database. The engine adapts the snapshot image according to the time period to create a modified snapshot image. The engine adapts the current image according to the time period to create a modified current image. The engine compares the modified snapshot image to the modified current image to create a delta. The engine references the delta to generate replicated data from the modified current data, and returns the replicated data to the consumer.

A non-transitory computer readable storage medium embodies a computer program for performing a method comprising an engine receiving from a consumer, a query including a start date of a time period, an end date of the time period, and a timestamp of a last synchronization date. The engine references the timestamp to create a snapshot image from a database. The engine references the query to create a current image from the database. The engine adapts the snapshot image according to the time period to create a modified snapshot image. The engine adapts the current image according to the time period to create a modified current image. The engine compares the modified snapshot image to the modified current image to create a delta. The engine references the delta to generate replicated data from the modified current data, and the engine returns the replicated data to the consumer.

An embodiment of a computer system comprises one or more processors and a software program executable on said computer system. The software program is configured to cause an in-memory database engine to receive from a consumer, a query including a start date of a time period, an end date of the time period, and a last synchronization date. The in-memory database engine references the last synchronization date to create a snapshot image from an in-memory database, and references the query to create a current image from the in-memory database. The in-memory database engine adapts the snapshot image according to the time period to create a modified snapshot image, and adapts the current image according to the time period to create a modified current image. The in-memory database engine compares the modified snapshot image to the modified current image to create a delta, references the delta to generate replicated data from the modified current data, and returns the replicated data to the consumer.

In some embodiments the date of last synchronization comprises a timestamp.

According to particular embodiments the delta includes an action code and previous values.

In certain embodiments the snapshot image is created from an audit table.

In various embodiments the engine is located in an application program interface of an application layer overlying a database layer.

In some embodiments the database comprises an in-memory database, and the engine comprises an in-memory database engine.

According to particular embodiments the consumer comprises middleware.

In some embodiments the consumer comprises a peer system.

In certain embodiments the delta is created from a plurality of slices of the time period.

According to various embodiments the engine creates the delta by referencing a parameter indicating another query for the same time period.

The following detailed description and accompanying drawings provide a better understanding of the nature and advantages of embodiments.

BRIEF DESCRIPTION OF THE DRAWINGS

FIG. 2C is a code snippet for requesting Period Delta Transmission according to an embodiment.

FIG. 2D shows the response of an API in an example.

FIG. 4C is a code snippet implementing a procedure for modification of images.

DETAILED DESCRIPTION

Described herein are methods and systems configured to provide an application program interface managing synchronization of data replication. In the following description, for purposes of explanation, numerous examples and specific details are set forth in order to provide a thorough understanding of the present invention. It will be evident, however, to one skilled in the art that embodiments of the present invention as defined by the claims may include some or all of the features in these examples alone or in combination with other features described below, and may further include modifications and equivalents of the features and concepts described herein.

Embodiments relate to an Application Program Interface (API) managing synchronization and replication of master data of a system with different consumers. An API engine is configured to receive from the third party, a query including content information and date-relevant information including a start date, an end date, and a date of last synchronization. The API engine processes the query to access the database and produce a query result replicating only data changes affecting that period or a time previous thereto. The consumer thus specifies the time period in which to consider changes to the stored database data, and the API calculates the delta according to that period and the provided last synchronization date. In this manner complex, time-dependent delta calculation and filtering logic can be implemented in the API without requiring substantial logic or additional data persistence in middleware. Particular embodiments may facilitate efficient synchronized replication of employment data from an entity's internal Human Resources Management (HRM) data warehouse, to third party service providers (e.g., payroll, benefits providers).

Figure 1:
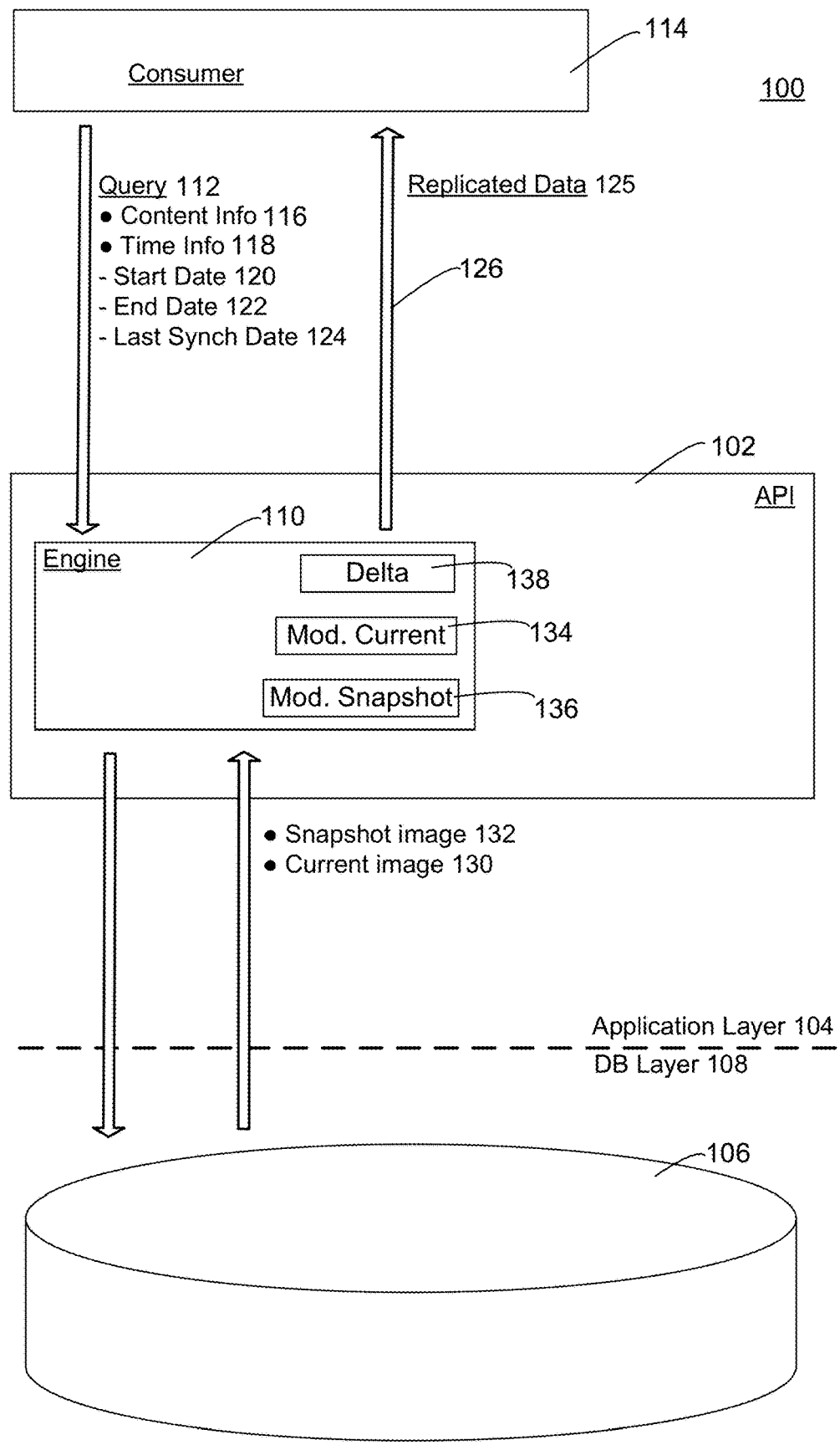
FIG. 1 shows a simplified view of an integration scenario that implements data synchronization.

FIG. 1 presents a simplified view of a system according to an embodiment. In particular, system 100 comprises an API 102 of an application layer 104, that is in communication with a database 106 of an underlying database layer 108. In one specific example, the API may comprise part of an entity's Human Resources Management (HRM) software application that is in communication with an underlying database of employment information.

The API includes an engine 110 configured to receive a query 112 from a consumer 114 of data. In an example, that consumer may comprise a third-party provider of employment services (e.g., payroll, benefits) located external to the entity.

The query includes content information 116 identifying particular data in the database that is responsive to the query. The query further includes time information 118 relevant to synchronizing the replicated data with the consumer.

In particular, the time information includes a start date 120 and an end date 122 defining a time period of data is sought by the consumer. The time information further includes a most recent date of synchronization 124 between the API and the consumer. In an example that last synchronization date may be reflected by a timestamp of a previous communication between the system and the consumer.

The engine processes the information of the query to access the database and replicate therefrom data that is relevant to the query. This replicated data 125 is returned to the consumer as a query result 126.

The engine is configured to replicate only data changes affecting that period or a time previous to that period. Accordingly, the engine reads a current data image 130 from the database and determines a snapshot image 132 on the basis of the change history. In certain embodiments that change history may be reflected by an audit table.

The 'Delta Processor' 138 adjusts the snapshot image and the current image according to the provided period, in order to create a modified current image 134 and a modified snapshot image 136.

By comparing the adjusted images, the engine calculates a delta between them. That delta forms the basis for determining which data of the database is relevant to the time information present in the query. As discussed below, that relevant data may reflect time-effective data changes.

Based upon the delta, the engine replicates the relevant data and communicates that replicated data to back to the consumer as the query result. In a specific example, the query result could include a change in employee marital status that is to be effective only as of a particular date falling within the time period provided.

Further details regarding various embodiments of data synchronization systems and methods are provided later below.

Figure 1A:
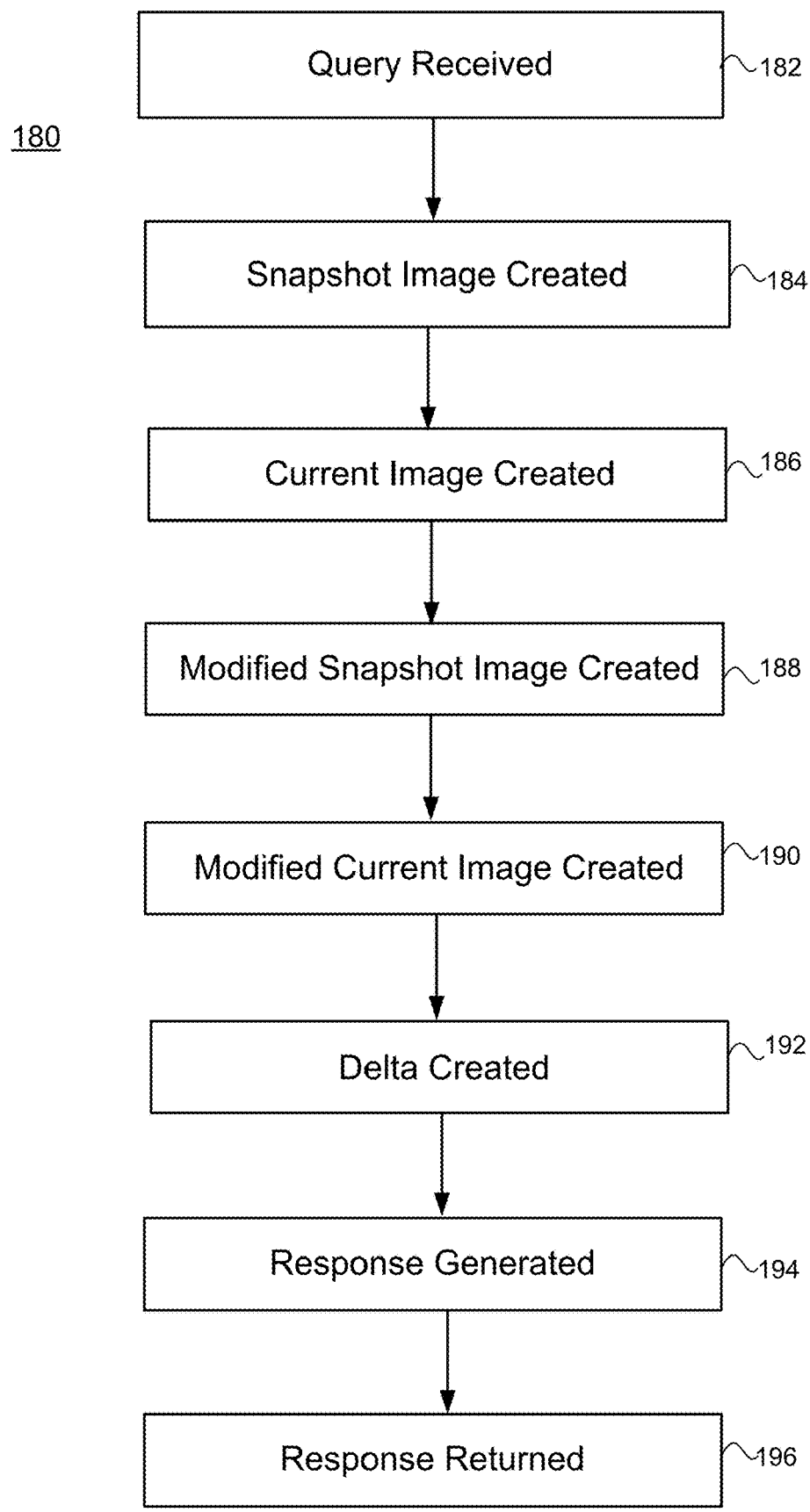
FIG. 1A shows a simplified flow diagram of a method according to an embodiment.

FIG. 1A is a simplified flow diagram showing a method 180 according to an embodiment. In a first step 182, an engine receives a query including a time period and a date of last synchronization.

In a second step 184 the engine references the last synchronization date to create a snapshot image from a database as of that last synchronization date. In a third step 186 the engine references the query to create a current image from the database recording its instant state.

In a fourth step 188 the engine adapts the snapshot image according to the time period to create a modified snapshot image. In a fifth step 190 the engine adapts the current image according to the time period to create a modified current image.

In a sixth step 192 the engine compares the modified snapshot image to the modified current image to create a delta. In a seventh step 194 the engine generates the response message based on the calculated delta.

In an eighth step 196 the engine returns the response message to the consumer.

EXAMPLE

An example is now provided in the context of storage and management of employment data by the Employee Central (EC) HRM system that is available from SuccessFactors, Inc., a subsidiary of SAP SE of Walldorf, Germany. In particular, a user in the human resources department of an entity accesses this EC platform in order to access stored employment data, and to update that stored data where appropriate.

The EC platform can also be used externally as leading application for exporting employee master data. Third parties (e.g., payroll, benefits providers) may consume global HR data in the form of EC employee data, in order to trigger their own services and follow-up processes.

Accordingly, regular replication of global HR data to the 3rd party systems is provided. In some systems, a direct (peer to peer) connection may be installed between EC and the target system for this purpose.

Alternatively, middleware technology may be utilized in which mapping operations can be executed. Examples for such middleware integration technologies are "Boomi" available from Dell Computers of Plano, Tex., and the "SAP Hana Cloud Integration (HCI)" available from SAP SE. Both are depicted together with EC in the specific system illustrated in FIG. 4A discussed later below.

Internally, a replication process calls the "Compound Employee API" (CE), a SOAP-based web service within EC to retrieve employee master data out of EC. Compound Employee API is a query API within EC, that is used to extract the employee master data relevant for 3rd party systems. The Compound Employee API response is structured very similar to the data structures in EC.

Compound Employee API is commonly used to synchronize employee master data between Employee Central and other on-demand or on-premise applications. It returns data about new employees and about changes of employee data. Replication of employee master data by calling Compound Employee API happens synchronously, which means that the response is rapidly returned.

Compound Employee API supports full transmission and delta transmission. In full transmission mode, the API replicates the complete employee data including future and historic data, regardless of whether the data was changed since the last replication or not.

According to embodiments, however, in delta transmission mode the API only returns elements which have been created, changed, or deleted since the last replication. In this particular example, the consumer may pass the timestamp of the last synchronization run.

The Compound Employee API then calculates the delta based on the historic data which was valid at the provided timestamp (snapshot) and the current data. The Compound Employee API returns the employee data using action codes (described below) in order to indicate which segments where changed, and previous values to indicate which attributes were changed.

In order to establish the data synchronization and to initially load the employee master data from EC into the consuming system, first a full-transmission query of Compound Employee API can be triggered. With this first synchronization, all employee data including historical data are sent to consuming systems.

From then on, only changed employees are sent to the consumers in order to update the employee master data on the consuming side accordingly. Conventionally, this could be done based upon changes occurring since the last synchronization (e.g., using the Compound Employee API full-transmission mode and by retrieving changed employees only). However, the response of the full transmission contains the complete historical data of the employees, leaving it to the data consumer (e.g., middleware) to determine which data of the employees has changed—a complex and time-consuming prospect.

Accordingly, the instant example relating to employment information, implements data synchronization of effective-date data. This data synchronization approach is hereafter also referred to as "Period Delta Transmission".

Period Delta Transmission seeks to limit the synchronization of the time dependent employee data to a given period, and to replicate only data that is relevant for this period. Thus for example, future-dated changes are not returned because they are not yet relevant.

Instead, changes are replicated that affect the given period. Furthermore, the consumer is informed about all time-dependent data that gets effective in this period.

However, so-called "retroactive changes" are also possible in Employee Central. Thus a change can be entered into the system that affects time periods in the past.

This earlier information is also passed to the consumer, because otherwise important information would be missing. Therefore, Period Delta Transmission will also return changes that become effective before the start date of the period.

In order to use this feature, the consumer of API provides the start date and the end date of the period, together with the date of the last synchronization. With every call, another period is requested and that these periods are disjoint—starting one after the other so that there are no gaps.

Where a same period is processed several times, the parameter isNotFirstQuery may be used. That parameter is described further below in connection with FIGS. 3H-I.

Furthermore, the last synchronization date may be adjusted with every call, independent of the decision whether the period is incremented or not.

There may be no limitation regarding the length of the period. It is possible to perform a daily synchronization using the same date as the start and end date of the period.

A potential benefit of this approach is that the consumer specifies the period for which he or she wishes to process changes of effective dated entities, and is not forced to handle changes after this period. Changes after the period will be exposed by Compound Employee API once the consumer calls the API for a period in which these changes become effective.

Some typical scenarios for Period Delta Transmission may include but are not limited to the following.

Monthly payroll processing. The consumer calls Compound Employee API at the end of the current payroll period, providing the start and end date of the period and the date of the last payroll run which corresponds to the date of last synchronization. Compound Employee API determines payroll relevant data changes which are relevant for the current payroll period, including retroactive changes. Changes which become effective after the current payroll period will be omitted and considered in a future payroll run.

Daily synchronization. The consumer calls Compound Employee on a daily basis to replicate all changes that become effective on this day. This variant can be used by consumers that are not able to handle effective dated entities at all and which need a snapshot of the changed data on a daily basis.

Figure 2A:
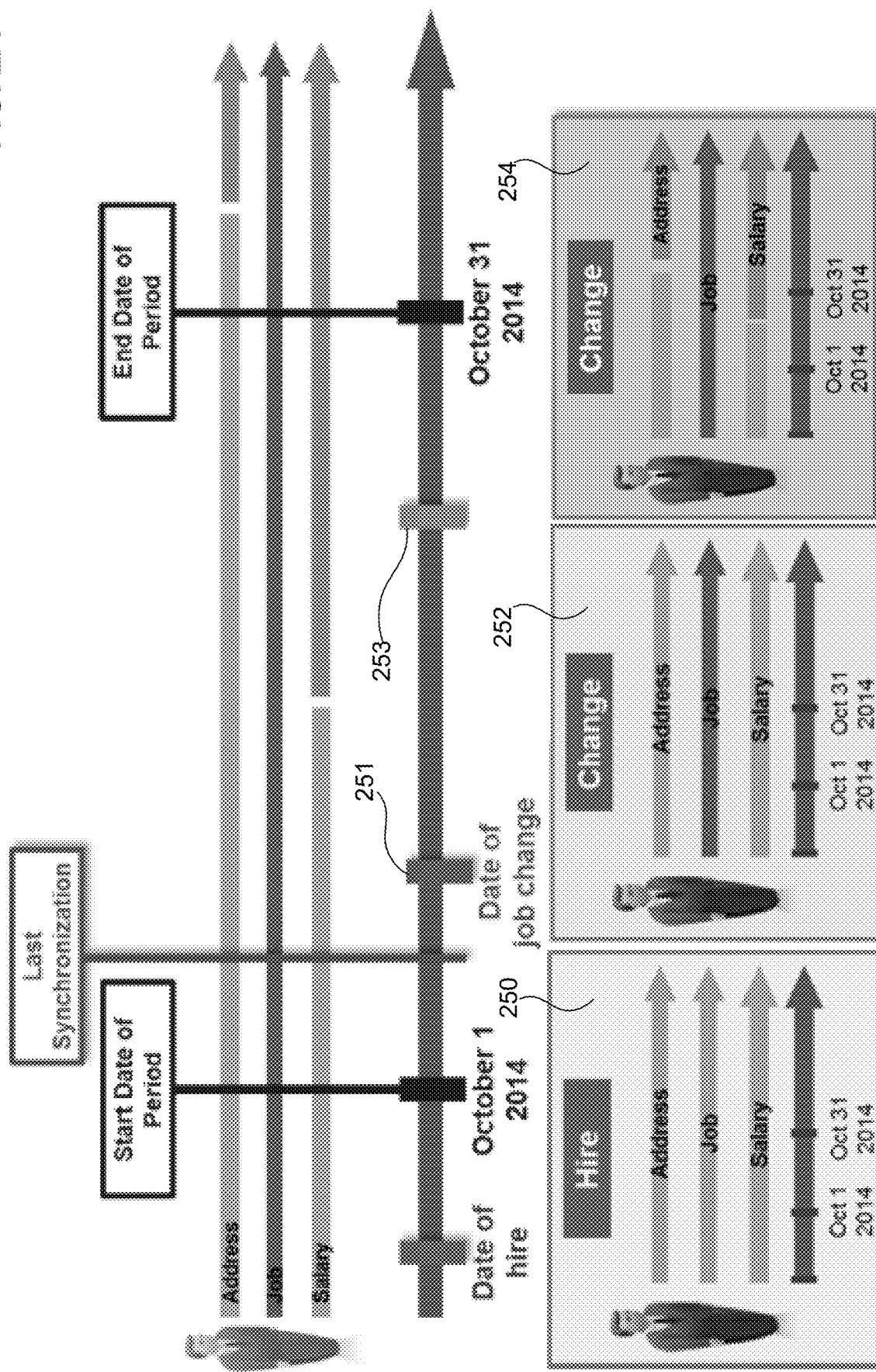
FIG. 2A shows different changes of an employee in an employment example.

FIG. 2A shows a simplified view of a scenario illustrating of the handing of employment data according to an example. Specifically, an employee is hired and created in the EC system in September 2014. The state of that employee's data as of the date of hire is shown as time slice 250.

At a first date 251 in the middle of October 2014, the job data of the employee is changed via 'Make correction'. The state of the employee's data reflecting the job change, is indicated in time slice 252.

Then, at a second date 253 prior to the end of October 2014 and after the first date, the salary was changed to become effective in the middle of October. The address was also changed becoming effective in November 2014. This further change in data of the employee is indicated in time slice 254. The last synchronization of the consumer took place before the this latest change of the job data.

In standard delta transmission, Compound Employee API selects all employees that were changed since the last synchronization, determines the snapshot image and the current image, and compares both images to calculate the delta. Here, the Compound Employee API would return all changes that happened since the last synchronization (i.e., the change of job, the change of the salary, and the future address change).

For a consumer using Period Delta Transmission and providing October 1st to Oct. 31, 2014 as synchronization period, only the change of the job and the change of the salary will be replicated, since these changes affect the given period and the data which has already been replicated to the consumer in the past. However the change of the address is suppressed and transmitted in the next period of November, when it becomes effective.

Thus according to the Period Delta Transmission approach, things look different over the standard approach. The API additionally considers employees that were changed before the last synchronization date, and whose changes become effective in the provided period. Furthermore, the Compound Employee API adapts the snapshot and the current image so that changes which become effective after the period are ignored.

This leads to the following features for Compound Employee API for the Period Delta Transmission. First, the API identifies employees having:

time slices starting within the provided period (e.g., 3rd Personal Info time slice 254 in FIG. 2A); or changed time slices starting before the period (e.g., 2nd Job Info time slice 252 in FIG. 2A); or changes of not effective-dated entities.

Figure 2B:
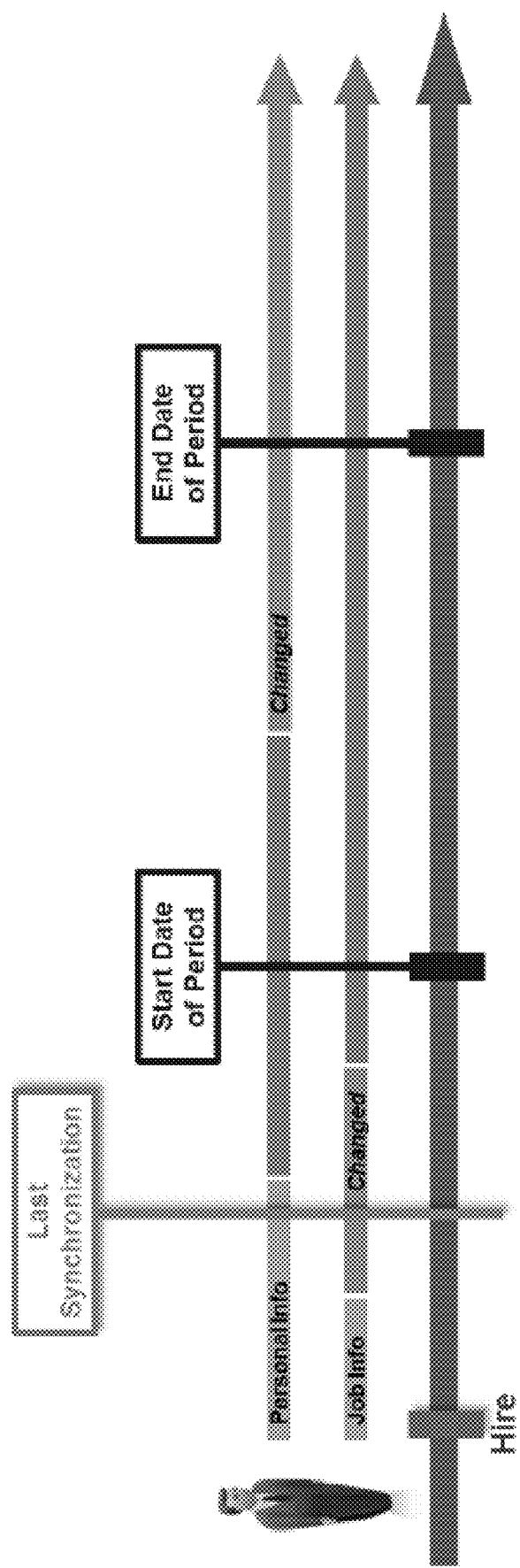
FIG. 2B shows relevant data of employees in the example.

For the selected employees (FIG. 2A), the Compound Employee API returns the following relevant data as shown in FIG. 2B:

time slices intersecting with the provided period (e.g., 3rd Personal Info time slice 254);

time slices starting before the provided period and that were changed (e.g., 2nd Job Info time slice 252);

all not effective-dated entities

The Compound Employee API may use action codes to denote at least:

time slices becoming effective in the provided period (e.g., 3rd Personal Info time slice 254);

changed time slices starting before the period (e.g., 2nd Job Info time slice 252);

changed entities that are not effective-dated.

FIG. 2C is a code snippet showing a request to be used when calling Compound Employee API in Period Delta Transmission according to an embodiment. The start date of the period is provided as fromDate and the end date as toDate. The timestamp of the last synchronization is passed as last_modifed_on. The queryMode parameter is used to call Compound Employee API in delta mode and has to be set to delta. The fromDate and toDate conditions are used for Period Delta Transmission—excluding them would lead to standard delta transmission.

FIG. 2D shows a response of Compound Employee API for an employee whose personal information was changed in the system on Oct. 27, 2014 with a last synchronization executed on October 26th.

Here, in this particular example the employee is slated to be married on Nov. 8, 2014. Therefore, a new time slice was inserted having start date 'Nov. 8, 2014' and the changed marital status.

Certain fields 200 are highlighted in FIG. 2D. These include the not effective-dated person segment, which has not changed. That segment thus has the action code: 'No change'.

Also highlighted in FIG. 2D is the effective-dated personal information segment reflecting the change becoming effective on November 8th. The action code of the segment is 'Change'.

FIG. 2D further highlights the marital status showing the new value (M)—married, and the previous value (S)—single.

According to this example, the employee would not be exposed as changed when executing a synchronization at October 27th. Instead, the updated information would be returned twelve days later, when the change of the marital status becomes effective.

FIGS. 3A-3I are simplified diagrams illustrating a plurality of use cases relevant to the instant example. In particular, these diagrams show the result of Period Delta Transmission for different situations and changes of effective dated entities.

FIGS. 3A-3I show the data as of the last synchronization run (top row), data currently in the system (middle row), and the resulting delta time slices including their action codes (bottom row). The examples are based on an effective dated entity like job or personal information.

Figure 3A:
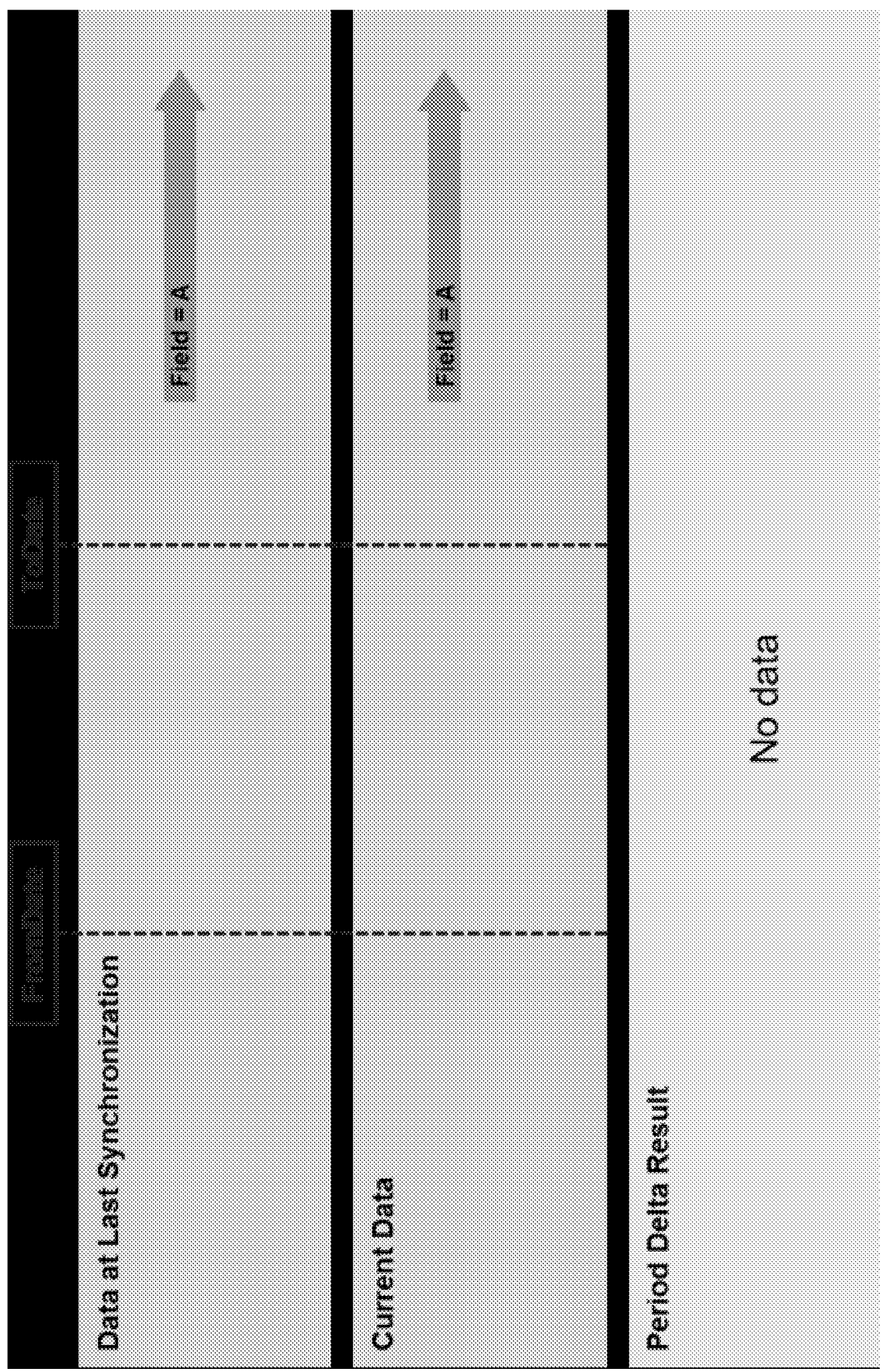
FIGS. 3A-3I show simplified views of various possible use cases.

FIG. 3A shows a use case with a first time slice starting after the provided period. Here, the employee has a time slice starting after the period. There is no data before this time slice.

Since there is no relevant data before and in the provided period, Period Delta Transmission will not return any data for the entity. The data is not relevant for the consumer yet, and will be exposed in a later synchronization run.

Figure 3B:
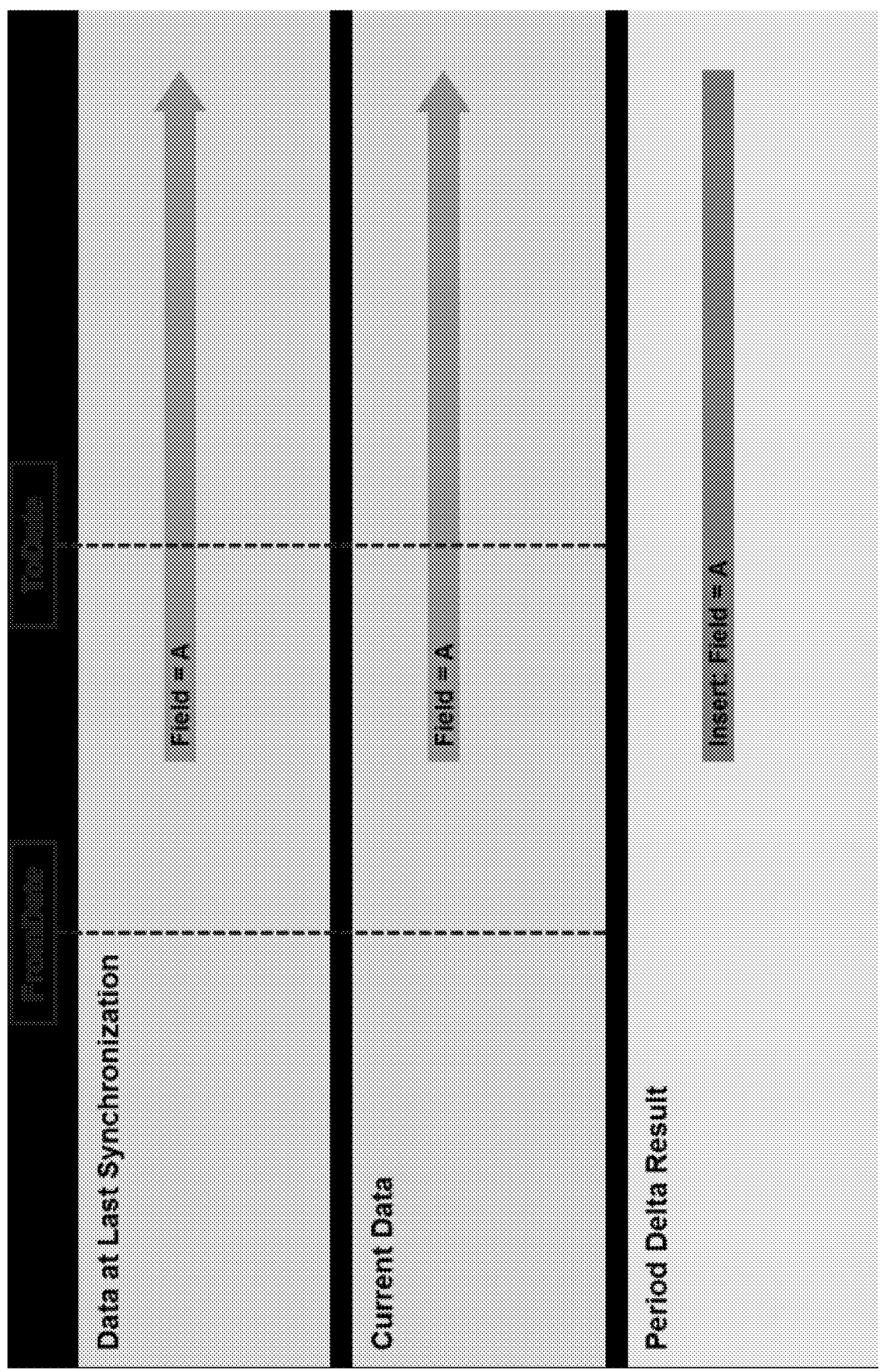

FIG. 3B illustrates a use case where a first time slice becomes effective in the provided period. Here the employee has a time slice starting in the period, and there is no time slice before. The Period Delta Transmission will return the time slice of the entity, because it becomes effective in the provided period. The action code will be 'Insert' since it is the first data for this entity which is replicated to the consumer.

Figure 3C:
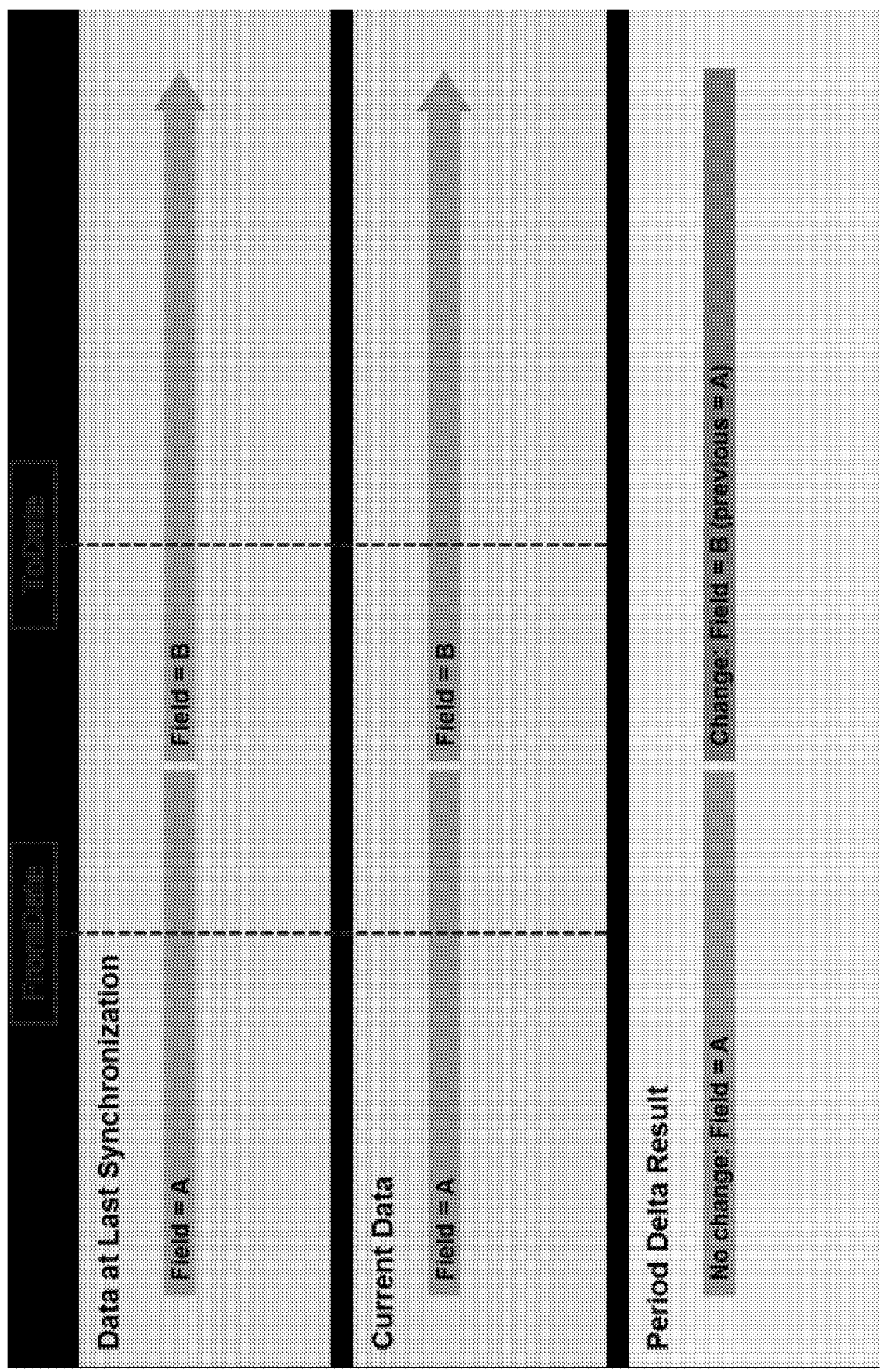

FIG. 3C illustrates a use case with a subsequent time slice becoming effective in the provided period. Here the employee already has data for the entity, and a subsequent time slice becomes effective in the provided period. The difference between the two time slices is the value of a field which changes from 'A' to 'B'.

The Period Delta Transmission approach will return the subsequent time slice because it becomes effective in the provided period. The action code is 'Change' since the first time slice with value 'A' was already replicated to the consumer in the past. The consumer is to be informed about the change of the value from 'A' to 'B' starting at the date of the second time slice.

Figure 3D:
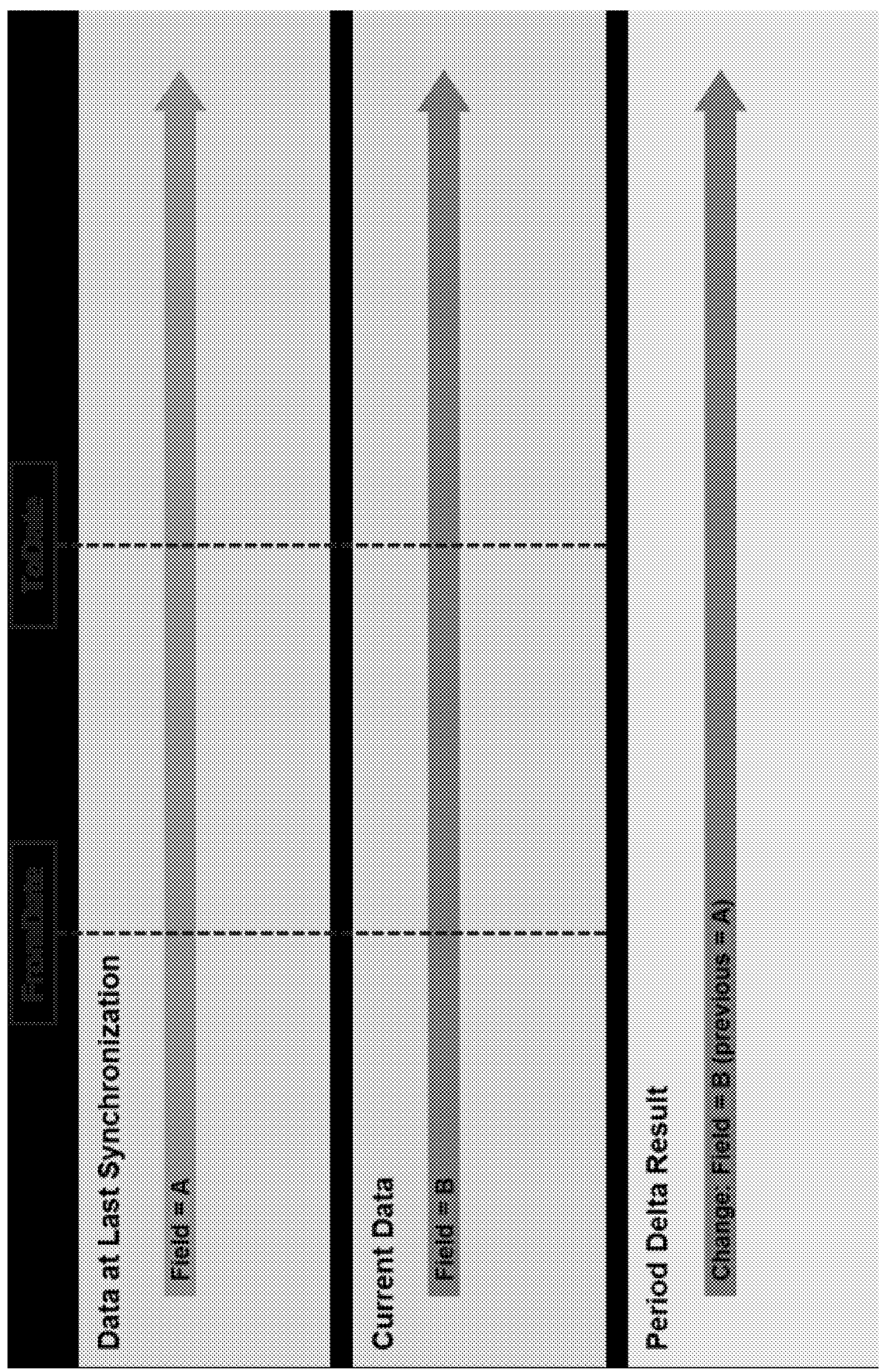

FIG. 3D illustrates a use case with a change of time slice starting before the provided period. Here, Period Delta Transmission will return the time slice because the change affects the provided period. The action code is 'Change', since the time slice with value 'A' was already replicated to the consumer.

Figure 3E:
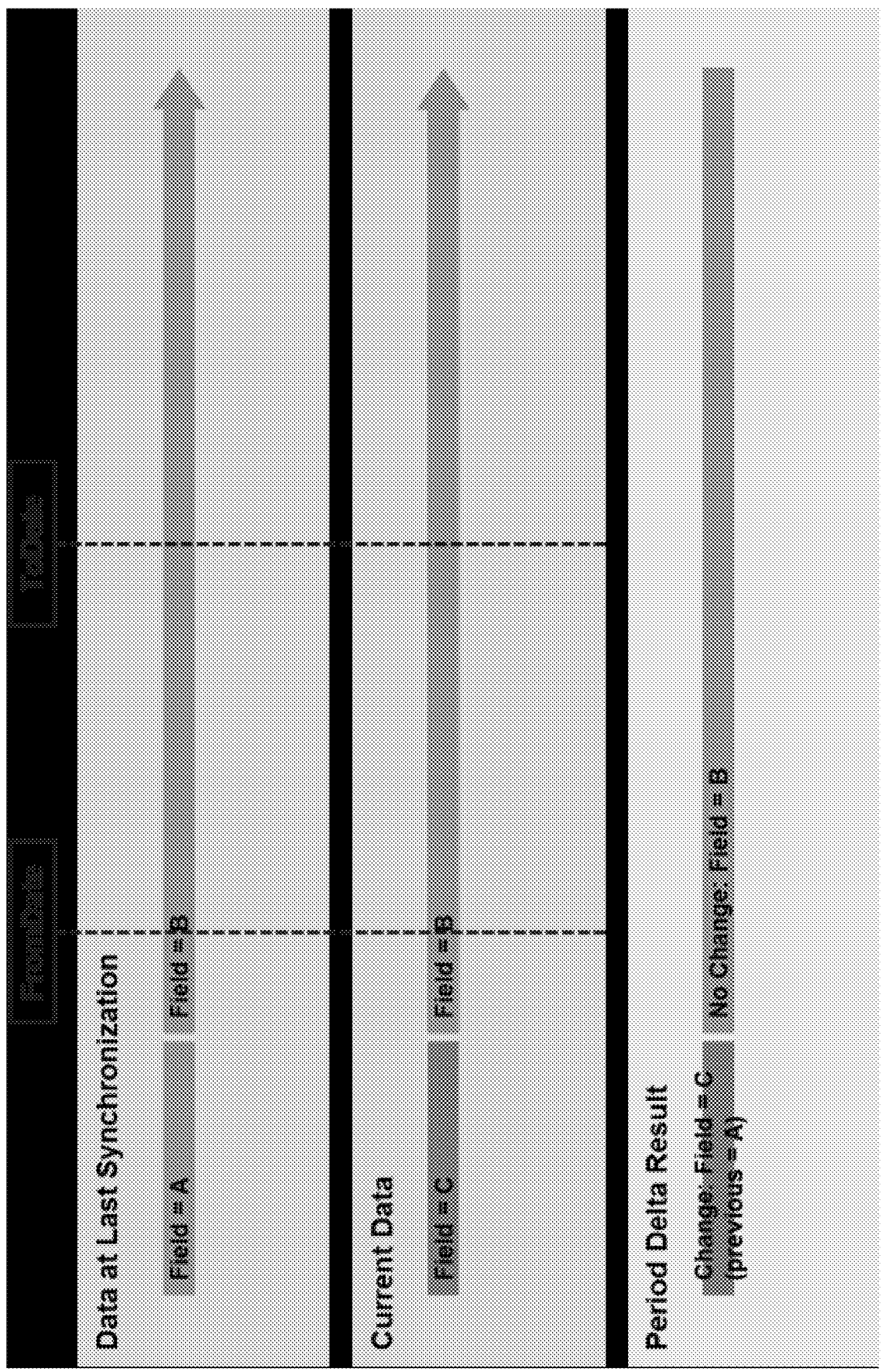

FIG. 3E illustrates a use case with a change of time slice starting and ending before the provided period. In this use case, a time slice starting and ending before the provided period is changed.

Here, Period Delta Transmission will return the time slice because it was already replicated with value 'A' to the consumer in the past. The action code is 'Change' and the field will be exposed with new value 'C' and previous value 'A'.

Figure 3F:
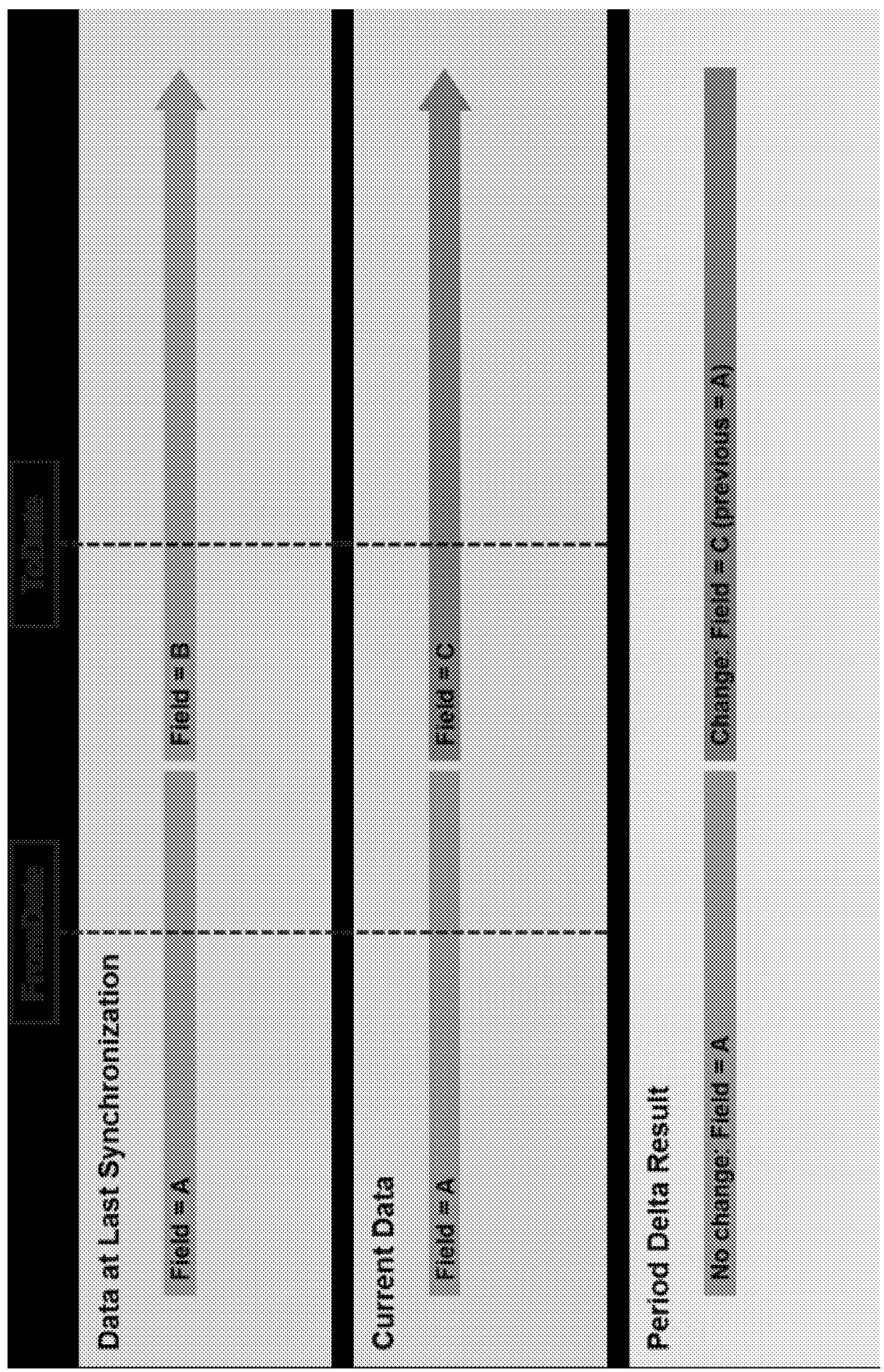

FIG. 3F shows a use case with a change of subsequent time slice becoming effective in the provided period. Here, the employee has already data for the entity and a subsequent time slice becomes effective in the provided period. Additionally the subsequent time slices has been changed since the last synchronization and a field was changed from value 'B' to 'C'.

Period Delta Transmission will return the subsequent time slice because it becomes effective in the provided period. The action code is 'Change', since the first time slice with value 'A' was already replicated to the consumer in the past. Since the subsequent time slice was not yet replicated to the consumer, he or she is not aware of the previous value 'B' that was valid at the last synchronization date. Therefore the consumer expects to be informed about the change of the value from 'A' to 'C' starting at the date of the second time slice.

Figure 3G:
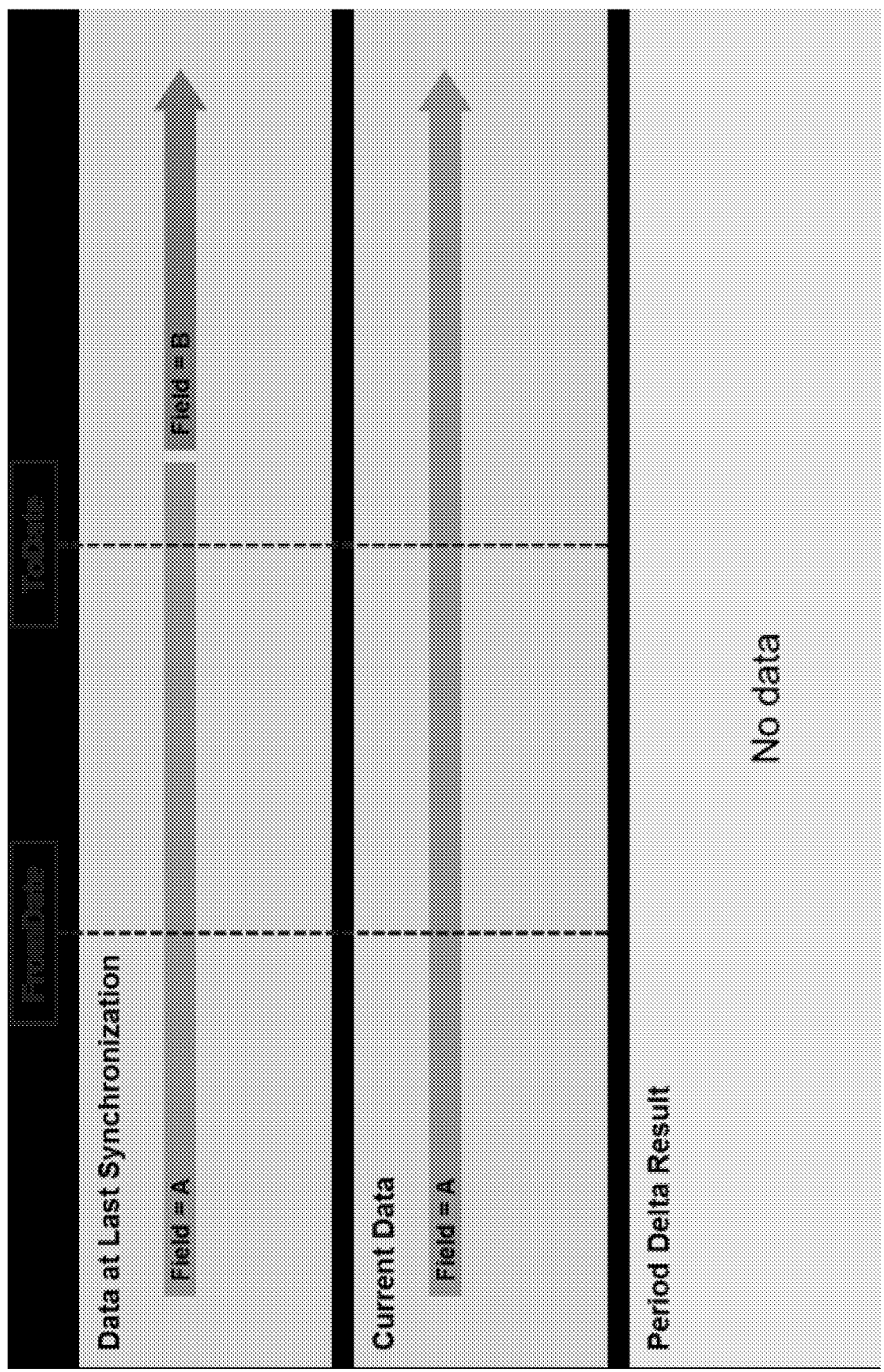

FIG. 3G illustrates a use case with deletion of subsequent time slice starting after the provided period. Here the employee already has data for the entity, and there is a subsequent time slice starting after the provided period. The first time slice has already been replicated in the past via Period Delta Transmission and the subsequent time slice was ignored so far since it starts in future. Now the subsequent time slice is deleted.

In this use case, Period Delta Transmission will not return any data because the deleted subsequent time slice has not been replicated to the consumer so far. Since the consumer is not aware of the subsequent time slice, he does not expect to get the information that a time slice was deleted.

Use cases described so far assume that the consumers call Compound Employee API only once for a period. This might be practicable under some circumstances (for example especially when using a short period, e.g. daily synchronization). For long periods (e.g., monthly) however, a more regular replication of changes might be appropriate.

For such scenarios, the Compound Employee API offers an additional parameter "isNotFirstQuery". This isNotFirstQuery parameter allows the consumer to call the API multiple times for the same period.

When including this parameter into the request, the API only considers data changes entered into the system since the last synchronization date and affecting the provided period or the time before that period. Unchanged data (e.g., already existing and untouched time slices becoming effective in the period) are no longer considered as changed, and therefore returned with action code "no change".

Figure 3H:
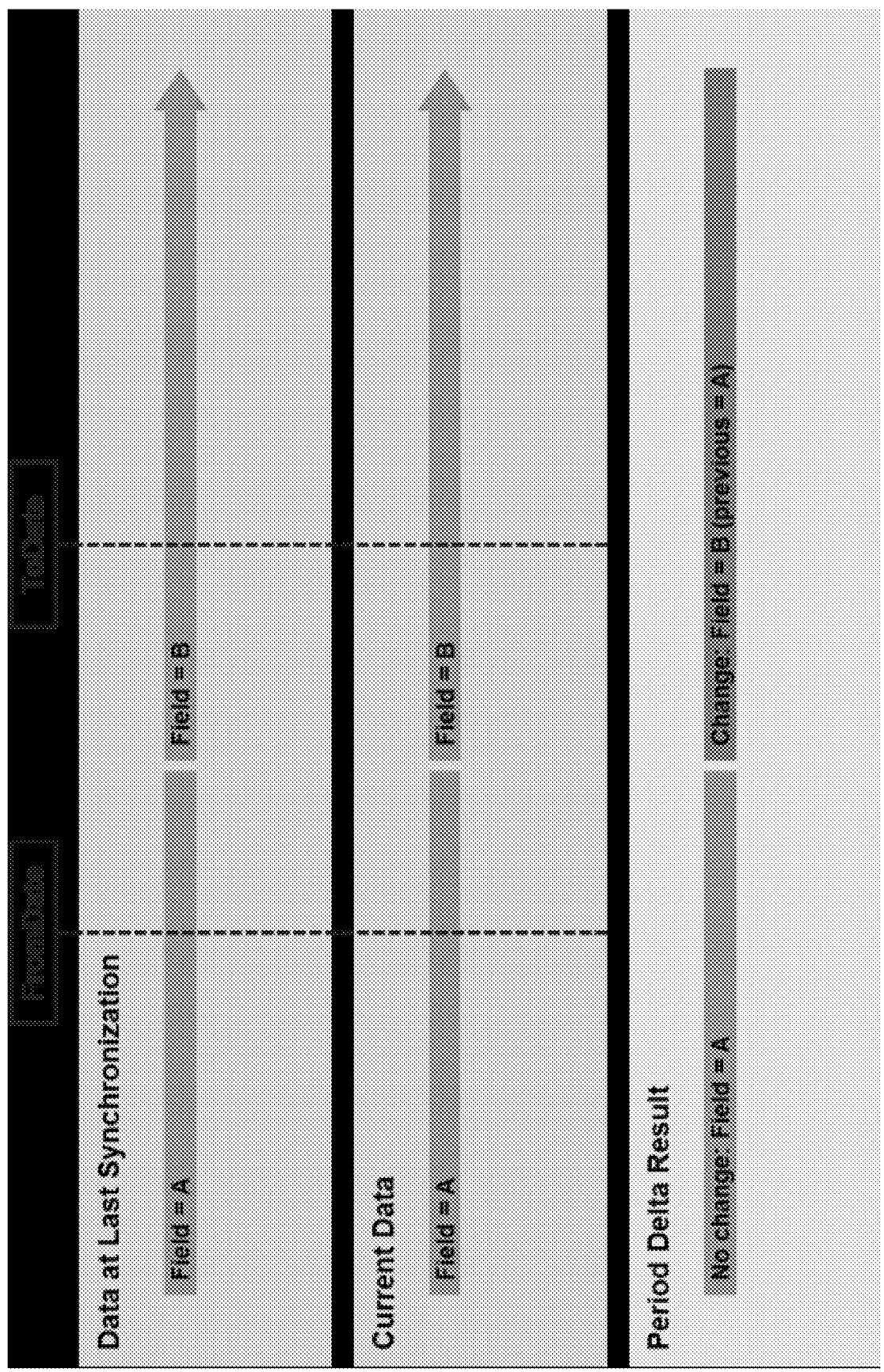

The following example shows the response of Compound Employee API depending on the value of the parameter for a subsequent time slice becoming effective in the period. In particular, FIG. 3H illustrates a sample use case if the parameter "isNotFirstQuery" is not included in the request.

Figure 3I:
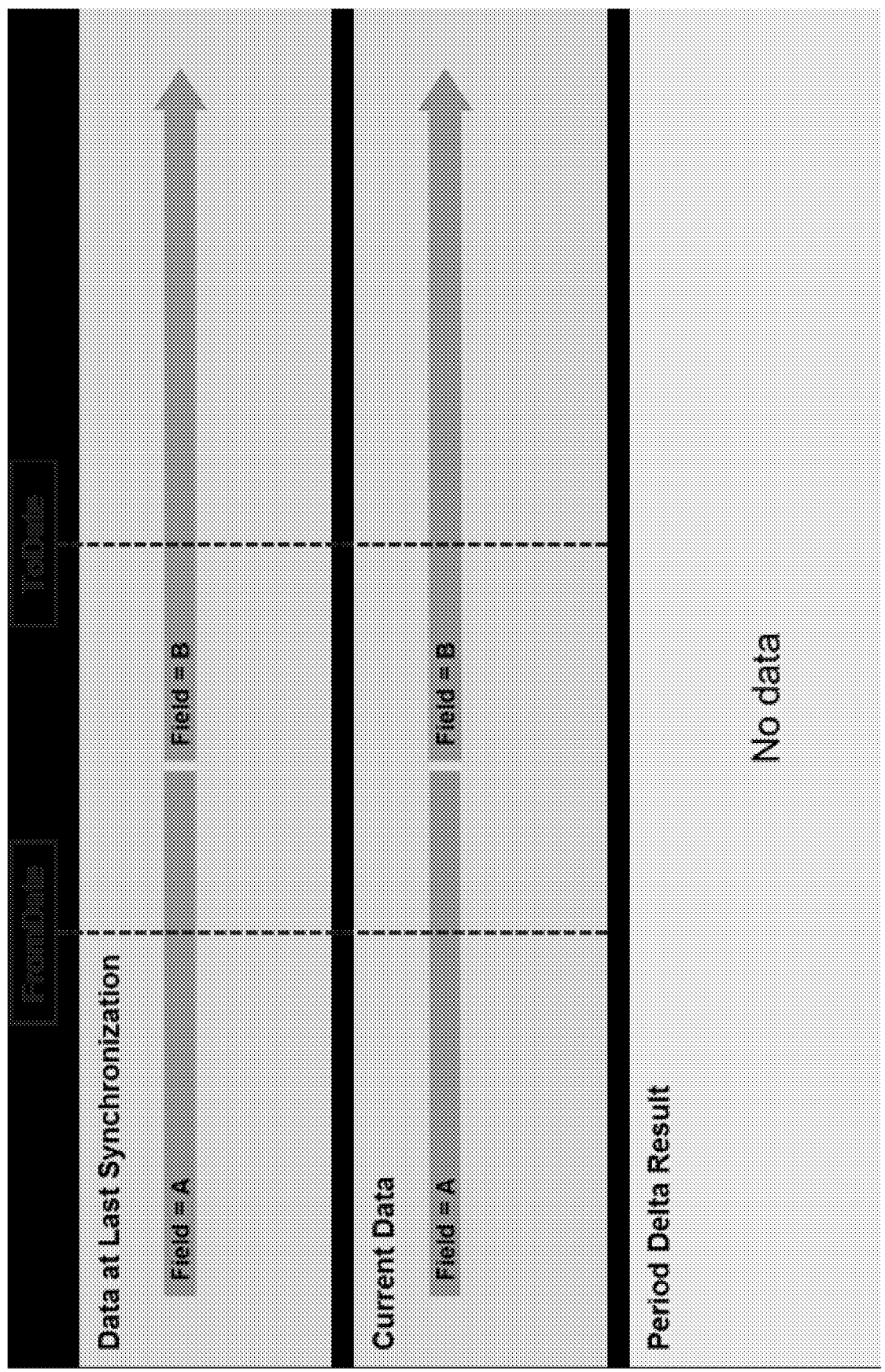

FIG. 3I shows a sample use case if the parameter "isNotFirstQuery", is included in the request.

Period Delta Transmission will not return the subsequent time slice if parameter isNotFirstQuery is set to true. This is because using the parameter with this value indicates to the API that the consumer had already called the API for the provided period some time before, and was therefore already informed about the subsequent time slice. Since the subsequent time slice was not changed since the last API call, Period Delta Transmission will not return any data.

Figure 4A:
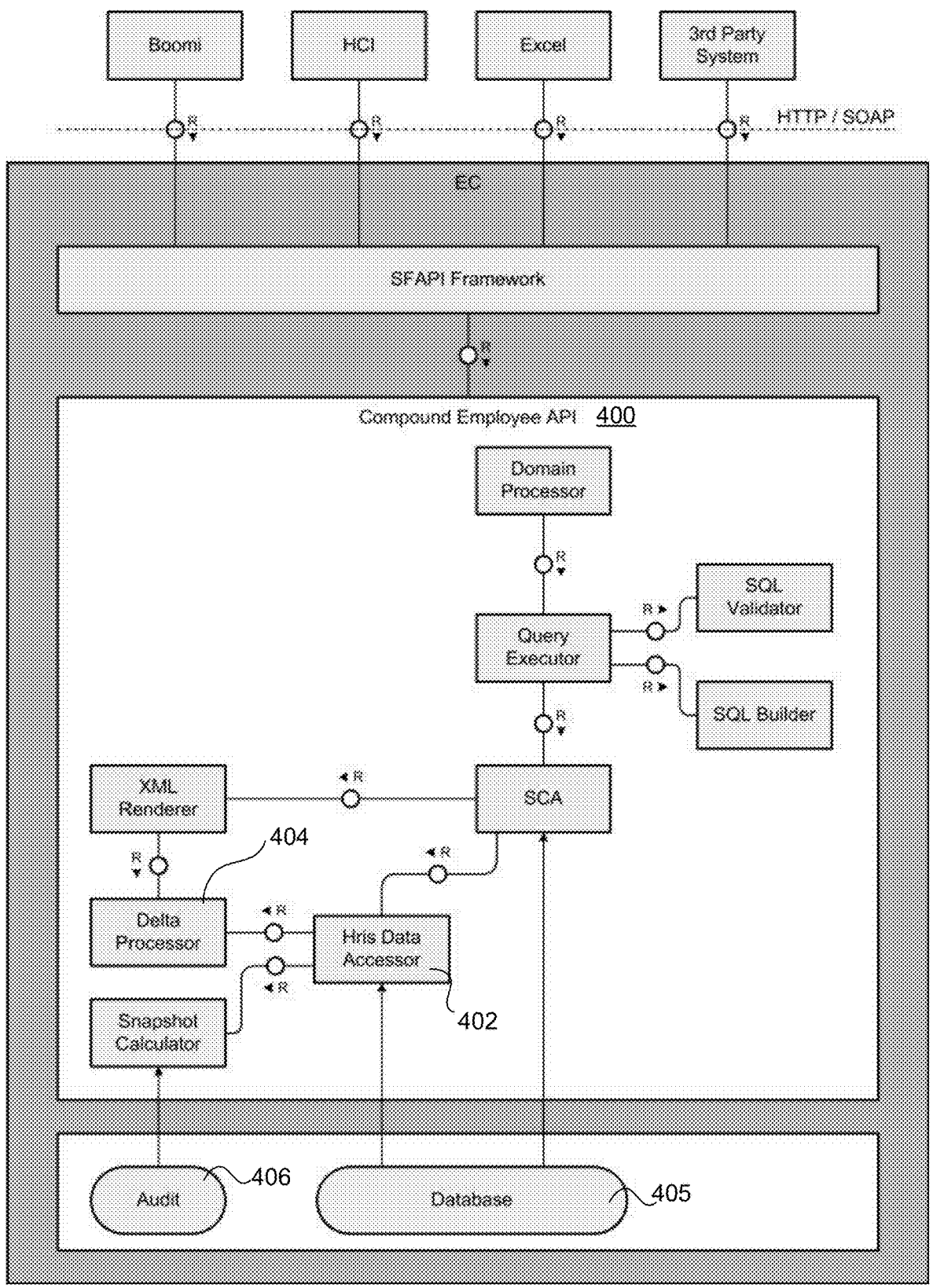
FIG. 4A is a simplified view of an exemplary architecture of an API for the EC system according to an example.

FIG. 4A is a simplified view of an exemplary architecture of an API for the EC system according to an embodiment. The SuccessFactors Data API is a SOAP Web Service designed for importing and exporting data to and from a SuccessFactors instance.

This API provides generic operations to access and modify data, as well as meta-data operations to allow runtime discovery of the data. The Compound Employee API is an implementation of the read operation, and it retrieves employee master data. The Compound Employee API supports full transmission and delta transmission.

As mentioned above, the Period delta transmission may be implemented as an extension of delta transmission. Period delta transmission targets consumers unable to otherwise handle effective dated entities and future changes.

Components of the exemplary Compound Employee API 400 of FIG. 4A which are involved in period delta calculation, include the "Hris Data Accessor" 402 and the "Delta Processor" 404.

The 'Hris Data Accessor' reads the current data from the database 405 and determines the snapshot image on the basis of the change history. The snapshot image is the data of the employee as it was in the system at the last synchronization timestamp. This process may reference an audit table 406.

While the particular example of FIG. 4A shows the audit table stored in the underlying data warehouse layer separate from the database, this is not required. In various embodiments the audit table could be within the database, e.g., an in-memory database.

The 'Delta Processor' adjusts the snapshot image and the current image according to the provided period. It calculates the delta by comparing the adjusted images.

The procedure for determining the delta depends on the EC entity in question. In this specific example, there are three categories of EC entities:
1. effective-dated entities without semantic key (e.g., segments: personal_information, job_information, compensation_information);
2. effective-dated entities with semantic key (e.g., address_information with semantic key address_type and country, pay_compensation_recurring with semantic key pay_component);
3. not effective-dated entities (e.g., phone, email, and employment).

A part of the procedure involves the determination of the current data and the snapshot data for entities of an employee. Both images are adjusted according to the provided period, and compared by the delta processor of the Compound Employee API in order to identify the changes.

Figure 4B:
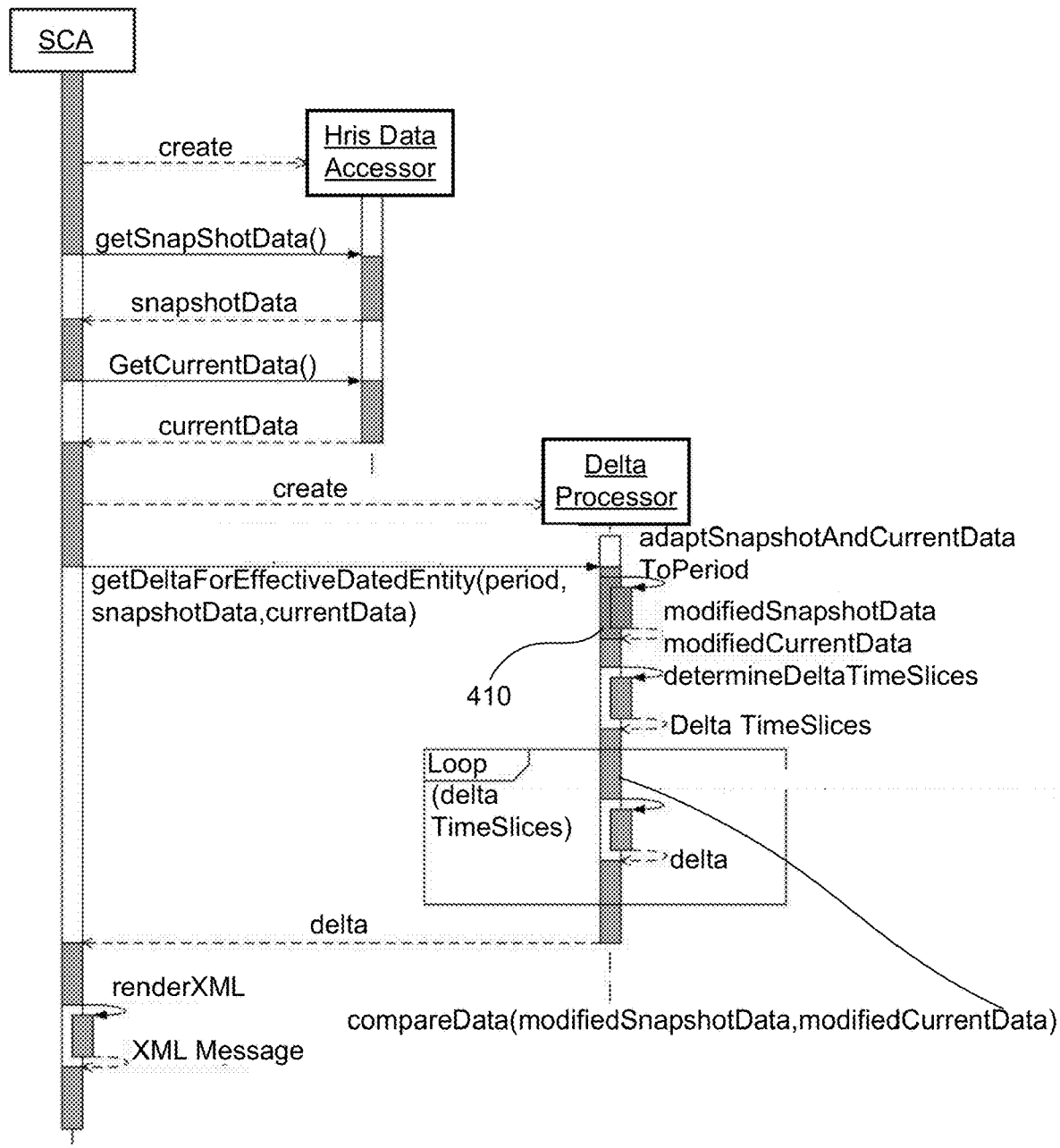
FIG. 4B shows a simplified view of the period delta calculation for an effective-dated entity in an example.

FIG. 4B shows a simplified view of the period delta calculation for an effective-dated entity. In particular, this figure shows the interaction of the components when calculating the delta for an effective-dated entity (like personal information or job information) for a provided period.

In FIG. 4B, the portion labeled 410 is the section were the snapshot image and the current image are modified according to the provided period. The modified images are the input for the comparison and the delta calculation.

The code snippet of FIG. 4C shows implementation of a procedure for the modification of the images. Depending on the type of image (e.g., snapshot or current image) and the parameter "isNotFirstQuery", embodiments determine the relevant date for the deletion of records.

Afterward, records starting after the relevant date are deleted and the end date of the last record is adapted. The code snippet shows the basic part of the procedure. That procedure may also include special logic for entities supporting multiple events per day (e.g., job information) or having an additional semantic key (e.g., address information).

Returning to FIG. 1, while that figure shows the engine as separate from the database layer, this is not required. In certain embodiments, the engine may be implemented by a database engine, such as an in-memory database engine.

Figure 5:
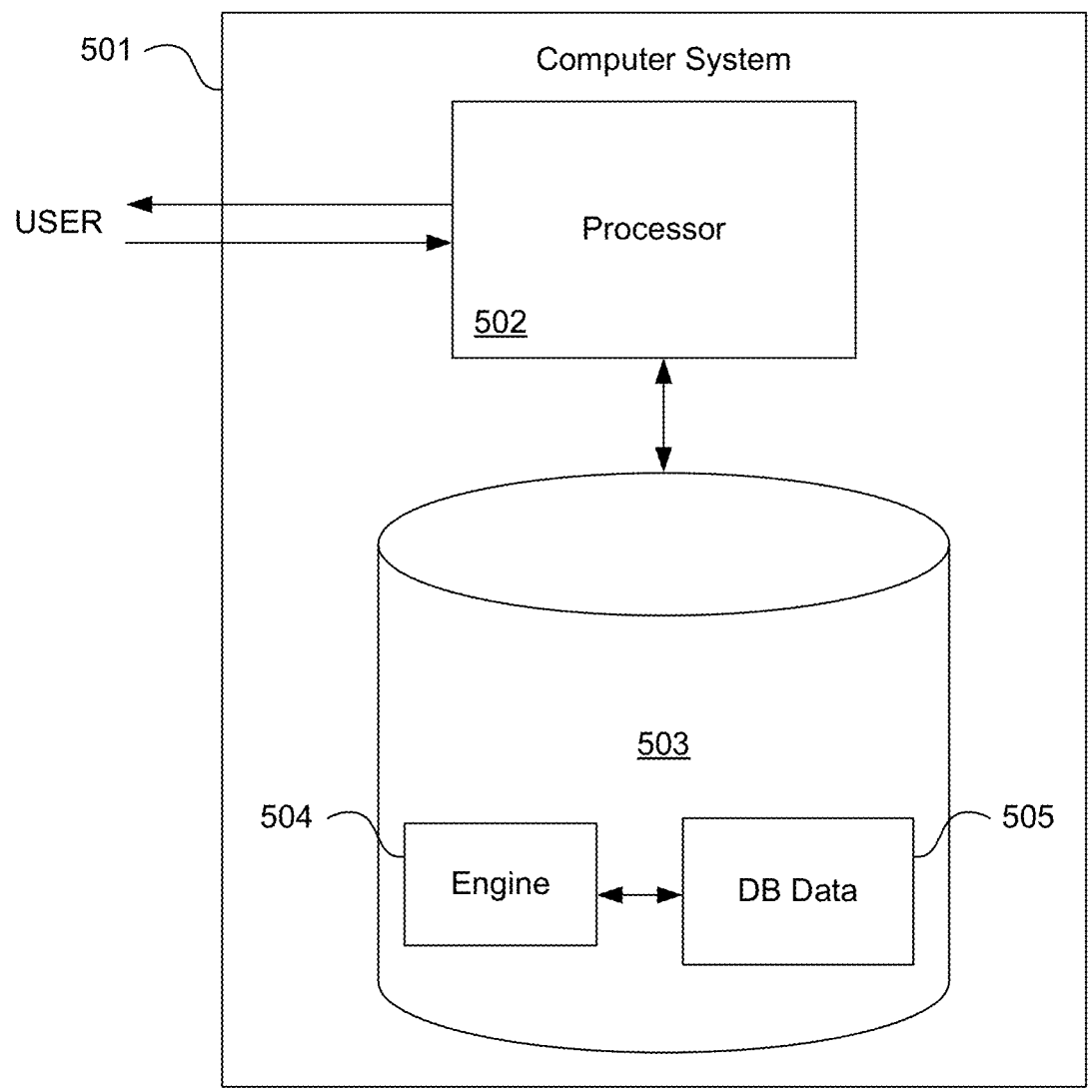
FIG. 5 illustrates hardware of a special purpose computing machine configured to provide data synchronization according to an embodiment.

For example, FIG. 5 illustrates hardware of a special purpose computing machine configured to provide data synchronization according to an embodiment. In particular, computer system 501 comprises a processor 502 that is in electronic communication with a non-transitory computer-readable storage medium 503. This computer-readable storage medium has stored thereon code 505 corresponding to database data. Code 504 corresponds to an engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

It is noted that in the specific embodiment of FIG. 5, the engine is shown as being part of a database. Such an embodiment can correspond to applications performing processing by a powerful engine available as part of an in-memory database (e.g., the HANA in-memory database available from SAP SE of Walldorf, Germany). However, this not required and in certain embodiments (e.g., that shown in FIG. 1) the engine may be implemented in other ways, for example as part of an overlying application layer.

Figure 6:
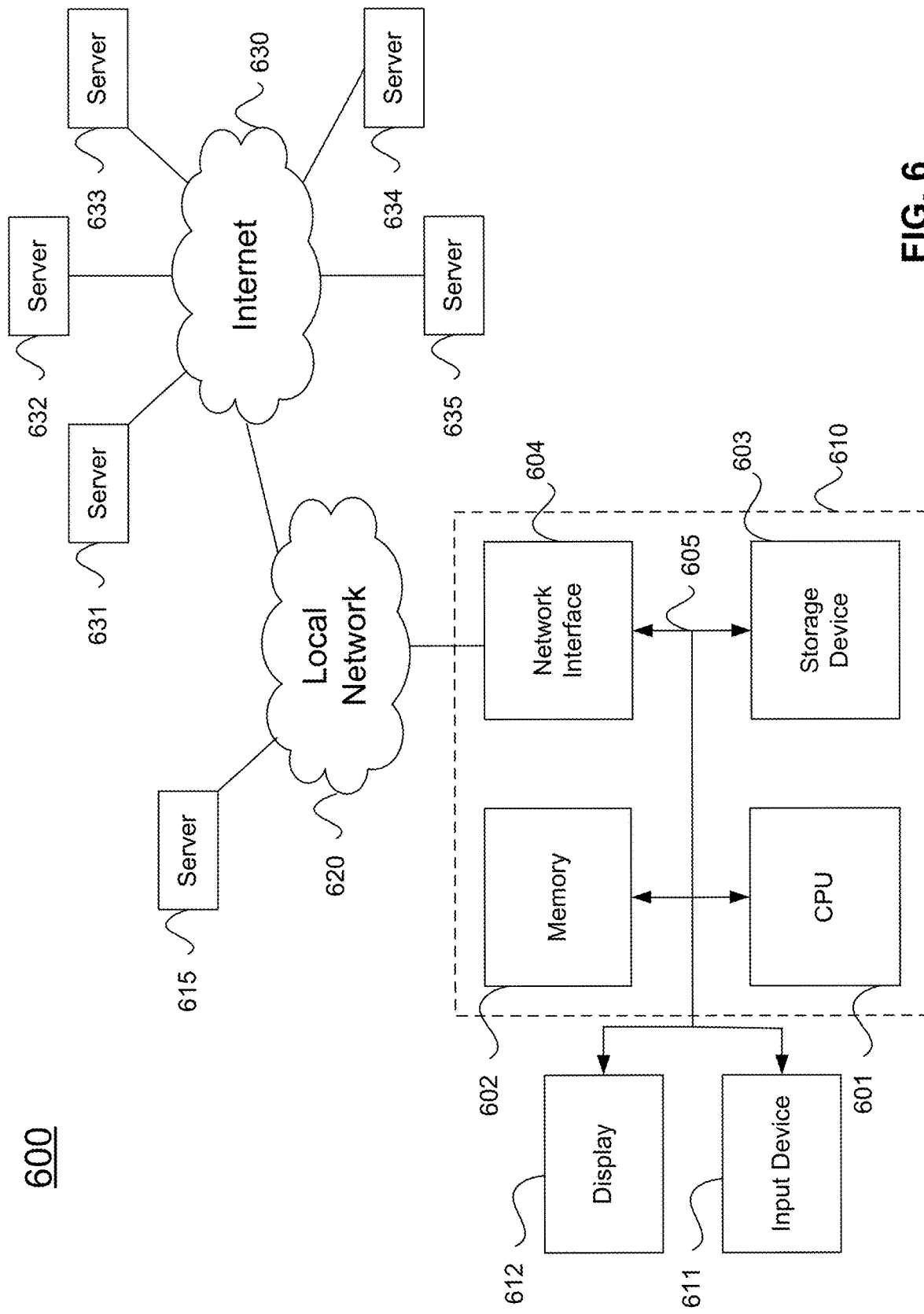
FIG. 6 illustrates an example computer system.

An example computer system 600 is illustrated in FIG. 6. Computer system 610 includes a bus 605 or other communication mechanism for communicating information, and a processor 601 coupled with bus 605 for processing information. Computer system 610 also includes a memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable mediums.

Computer system 610 may be coupled via bus 605 to a display 612, such as a cathode ray tube (CRT) or liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 610 can send and receive information, including messages or other interface actions, through the network interface 604 across a local network 620, an Intranet, or the Internet 630. For a local network, computer system 610 may communicate with a plurality of other computer machines, such as server 615. Accordingly, computer system 610 and server computer systems represented by server 615 may form a cloud computing network, which may be programmed with processes described herein. In the Internet example, software components or services may reside on multiple different computer systems 610 or servers 631-635 across the network. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
an in-memory database engine of an in-memory database receiving from a consumer, a query including a start date of a time period, an end date of the time period, and a last synchronization date;
the in-memory database engine referencing the last synchronization date and an audit table separate from the in-memory database and from the query, to create a snapshot image from the in-memory database;
the in-memory database engine referencing the query to create a current image from the in-memory database;
the in-memory database engine adapting the snapshot image according to the time period to create a modified snapshot image;

the in-memory database engine adapting the current image according to the time period by suppressing a change not yet in effect during the time period, to create a modified current image;

the in-memory database engine comparing the modified snapshot image to the modified current image to create a delta including previous values and an action code by referencing a binary value parameter indicating an earlier query from the consumer for the same time period;

the in-memory database engine referencing the delta to generate replicated data from the modified current data; and the in-memory database engine returning the replicated data to the consumer.

2. A method as in claim 1 wherein the date of last synchronization comprises a timestamp.

3. A method as in claim 1 wherein the consumer comprises middleware.

4. A method as in claim 1 wherein the consumer comprises a peer system.

5. A method as in claim 1 wherein the delta is created from a plurality of slices of the time period.

6. A non-transitory computer readable storage medium embodying a computer program for performing a method, said method comprising:
an in-memory database engine of an in-memory database receiving from a consumer, a query including a start date of a time period, an end date of the time period, and a timestamp of a last synchronization date;

the in-memory database engine referencing the timestamp and an audit table separate from the in-memory database and from the query, to create a snapshot image from the in-memory database;

the in-memory database engine referencing the query to create a current image from the in-memory database;

the in-memory database engine adapting the snapshot image according to the time period to create a modified snapshot image;

the in-memory database engine adapting the current image according to the time period by suppressing a change not yet in effect during the time period, to create a modified current image;

the in-memory database engine comparing the modified snapshot image to the modified current image to create a delta including previous values and an action code by referencing a binary value parameter indicating an earlier query from the consumer for the same time period;

the in-memory database engine referencing the delta to generate replicated data from the modified current data; and the in-memory database engine returning the replicated data to the consumer.

7. A non-transitory computer readable storage medium as in claim 6 wherein the delta is created from a plurality of slices of the time period.

8. A computer system comprising:
one or more processors;
a software program, executable on said computer system, the software program configured to cause an in-memory database engine of an in-memory database to:

receive from a consumer, a query including a start date of a time period, an end date of the time period, and a last synchronization date;

reference the last synchronization date and an audit table separate from the in-memory database and from the query, to create a snapshot image from the in-memory database;

reference the query to create a current image from the in-memory database;

adapt the snapshot image according to the time period to create a modified snapshot image;

adapt the current image according to the time period by suppressing a change not yet in effect during the time period, to create a modified current image;

compare the modified snapshot image to the modified current image to create a delta including previous values and an action code by referencing a binary value parameter indicating an earlier query from the consumer for the same time period;

reference the delta to generate replicated data from the modified current data; and return the replicated data to the consumer.

9. A computer system as in claim 8 wherein the date of last synchronization comprises a timestamp.

\* \* \* \* \*